(12) United States Patent  (10) Patent No.: US 8,186,622 B2
Munday  (45) Date of Patent: May 29, 2012

(54) AIRCRAFT COMPONENT

(75) Inventor: Andrew Robert Munday, Bristol (GB)

(73) Assignee: Airbus Operations Limited, Bristol (GB)

( * ) Notice: Subject to any disclaimer, the term of this patent is extended or adjusted under 35 U.S.C. 154(b) by 721 days.

(21) Appl. No.: 12/225,137

(22) PCT Filed: Mar. 21, 2007

(86) PCT No.: PCT/GB2007/000977
§ 371 (c)(1),
(2), (4) Date: Sep. 15, 2008

(87) PCT Pub. No.: WO2007/110586
PCT Pub. Date: Oct. 4, 2007

(65) Prior Publication Data
US 2009/0272848 A1 Nov. 5, 2009

(30) Foreign Application Priority Data
Mar. 27, 2006 (GB) .................................. 0606079.2

(51) Int. Cl.
*B64C 1/12* (2006.01)
(52) U.S. Cl. .................... 244/132; 244/129.1; 244/123.1
(58) Field of Classification Search ............... 244/123.1, 244/123.4, 123.8, 124, 129.1, 131, 132
See application file for complete search history.

(56) References Cited

U.S. PATENT DOCUMENTS
2,367,750 A * 1/1945 Berkow et al. ............. 244/123.2
(Continued)

FOREIGN PATENT DOCUMENTS
EP 0 048 191 3/1982
(Continued)

OTHER PUBLICATIONS
International Search Report for PCT/GB2007/000977, mailed Jul. 17, 2007.
(Continued)

*Primary Examiner* — Benjamin P Lee
(74) *Attorney, Agent, or Firm* — Nixon & Vanderhye, PC (57) ABSTRACT

A method of manufacturing an aircraft component such as a wing rib. The method comprises: providing a body with two or more connectors arranged in a line on the body, each connector having an arm extending from the body, a first flange positioned on a first side of the line, and a second flange positioned on a second side of the line; and attaching a separate connector to the body, the separate connector having an arm extending from the body, a first flange positioned on a first side of the line and a second flange positioned on a second side of the line. A connector for transferring load between a body of an aircraft component and a cover, the cover having an aerodynamic external surface, the connector comprising: a plate for securing the connector to the body of the aircraft component; the plate having a first face on a first side of the connector, a second face on a second side of the connector, and an edge between the first and second faces; an arm extending from the edge of the plate; a first flange carried by the arm on a first side of the connector, and a second flange carried by the arm on a second side of the connector. The arm has a relatively wide base adjacent to the edge of the plate and a relatively narrow distal end which carries the flanges.

15 Claims, 6 Drawing Sheets

U.S. PATENT DOCUMENTS

| | | | |
|---|---|---|---|
| 2,496,024 A * | 1/1950 | Schwendler et al. | 244/124 |
| 3,827,661 A * | 8/1974 | Ryan et al. | 244/123.8 |
| 3,920,206 A * | 11/1975 | Bigham et al. | 244/132 |
| 4,310,132 A * | 1/1982 | Frosch et al. | 244/119 |
| 4,356,616 A * | 11/1982 | Scott | 29/897.2 |
| 4,481,703 A * | 11/1984 | Scott | 29/525.06 |
| 5,518,208 A | 5/1996 | Roseburg | |
| 5,924,650 A * | 7/1999 | Richichi | 244/131 |
| 6,374,570 B1 | 4/2002 | McKague, Jr. | |
| 6,375,120 B1 * | 4/2002 | Wolnek | 244/123.8 |
| 6,786,452 B2 * | 9/2004 | Yamashita et al. | 244/123.1 |
| 7,037,568 B1 * | 5/2006 | Rogers et al. | 428/119 |
| 7,578,473 B2 * | 8/2009 | Shortman | 244/123.1 |
| 7,635,106 B2 * | 12/2009 | Pham et al. | 244/131 |
| 7,686,251 B2 * | 3/2010 | Tanner et al. | 244/132 |
| 7,721,995 B2 * | 5/2010 | Tanner et al. | 244/132 |
| 7,740,202 B2 * | 6/2010 | Namaizawa et al. | 244/123.1 |
| 2004/0051005 A1 | 3/2004 | Bergmann | |
| 2004/0056152 A1 | 3/2004 | Yamashita | |
| 2005/0082431 A1 | 4/2005 | Scown | |
| 2005/0263645 A1 | 12/2005 | Johnson | |
| 2006/0038071 A1 | 2/2006 | Schoene | |
| 2006/0226287 A1 * | 10/2006 | Grantham et al. | 244/119 |
| 2007/0023573 A1 * | 2/2007 | Neale et al. | 244/124 |
| 2008/0128552 A1 * | 6/2008 | Namaizawa et al. | 244/123.1 |
| 2008/0128554 A1 * | 6/2008 | Pham et al. | 244/131 |
| 2008/0223987 A1 * | 9/2008 | Halme et al. | 244/123.1 |
| 2009/0189019 A1 * | 7/2009 | Shortman | 244/123.1 |
| 2009/0314892 A1 * | 12/2009 | Kunichi et al. | 244/123.1 |
| 2010/0148008 A1 * | 6/2010 | Hernando Sebastian et al. | 244/131 |

FOREIGN PATENT DOCUMENTS

| | | |
|---|---|---|
| GB | 117926 | 7/1917 |
| GB | 131969 | 7/1918 |
| GB | 412232 | 11/1933 |
| WO | 2004/018183 | 3/2004 |
| WO | WO 2006001860 A2 * | 1/2006 |

OTHER PUBLICATIONS

Written Opinion of the International Searching Authority for PCT/GB2007/000977, Jul. 17, 2007.

Great Britain Search Report for GB Application No. 0606079.2, dated Aug. 9, 2006.

* cited by examiner

AIRCRAFT COMPONENT

This application is the U.S. national phase of International Application No. PCT/GB2007/000977, filed 21 Mar. 2007, which designated the U.S. and claims priority to Great Britain Application No. 0606079.2, filed 27 Mar. 2006, the entire contents of each of which are hereby incorporated by reference.

FIELD OF THE INVENTION

The present invention relates to an aircraft component, a method of manufacturing an aircraft component, and a connector for transferring load between the body of an aircraft component and a cover. The connector may be, for example, a rib foot for transferring load between a wing skin and a wing rib.

BACKGROUND OF THE INVENTION

A rib foot of an aircraft wing rib is described in WO 01/76943. The rib foot has a pair of flanges, each having a pair of guide holes which have been drilled in the final locations of the final assembly holes, used for securing the wing skin.

In the event of failure of the rib foot, the entire load-bearing rib foot is lost and all of the load is transferred to adjacent rib feet. This can result in excessive loads being transferred to adjacent rib feet which can compromise the structural integrity of the aircraft wing.

SUMMARY OF THE INVENTION

A first aspect of the invention provides a method of manufacturing an aircraft component, the method comprising:
 providing a body with two or more connectors arranged in a line on the body, each connector having an arm extending from the body, a first flange positioned on a first side of the line and a second flange positioned on a second side of the line; and
 attaching a separate connector to the body, the separate connector having an arm extending from the body, a first flange positioned on a first side of the line, and a second flange positioned on a second side of the line,
 wherein the arm of the separate connector overlaps the arm of an adjacent one of the connectors when viewed from a side of the line.

The method of the first aspect of the invention enables the separate connector to be attached close to an adjacent connector in the line, whilst reducing the chance of a crack propagating between them. In the event of failure of the separate connector, by positioning the flanges on opposite sides of the line, load will be transferred in a symmetrical manner to the remaining connectors.

A second aspect of the invention provides an aircraft component comprising a body; and a series of connectors arranged in a line on the body, each connector having an arm extending from the body, a first flange positioned on a first side of the line and a second flange positioned on a second side of the line, wherein at least one of the connectors is a separate connector which has been attached to the body, and wherein the arm of the separate connector overlaps the arm of an adjacent one of the connectors when viewed from a side of the line.

The component can be fastened to a cover by welding, or more preferably by passing fastening elements (such as bolts) through the flanges of the connectors and through the cover. The cover is typically an element having an aerodynamic external surface, such as a fuselage skin or wing skin. Typically the cover has an internal surface carrying a plurality of strengtheners, each strengthener being received in a channel between a pair of the connectors. The connectors and the cover may be formed from different materials, such as metal and composite respectively.

The arm of the separate connector overlaps the arm of an adjacent connector when viewed from a side of the line. This provides a compact arrangement, and enables the arm of the separate connector and/or the arm of the adjacent connector to be provided with a strengthening portion which overlaps the other arm when viewed from a side of the line. Preferably the strengthening portion has an angled edge, to increase its bending stiffness.

Typically the arm of the separate connector has a relatively wide base adjacent to the body and a relatively narrow distal end which carries the flanges. This also increases the bending stiffness of the arm.

In the preferred embodiment the aircraft component comprises a wing rib, and the connectors comprise rib feet. However, the invention may be applicable to other aircraft components, such as a fuselage component.

Typically each flange has one or more fastening holes for receiving a fastening element. In the preferred embodiment described below, the flanges of the separate connector, and of an adjacent connector (next to the separate connector), have fewer holes than the other connectors in the line.

Typically the separate connector comprises:
 a plate for securing the connector to the body of the aircraft component; the plate having a first face on a first side of the connector, a second face on a second side of the connector, and an edge between the first and second faces;
 an arm extending from the edge of the plate;
 a first flange carried by the arm on a first side of the connector, and
 a second flange carried by the arm on a second side of the connector,
wherein the arm has a relatively wide base adjacent to the edge of the plate and a relatively narrow distal end which carries the flanges.

The symmetrical structure of the connector makes it suitable for use in the method of the first aspect of the invention.

The plate may be welded to the body, but more preferably the plate has two or more fastening holes for receiving fastening elements (such as bolts).

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
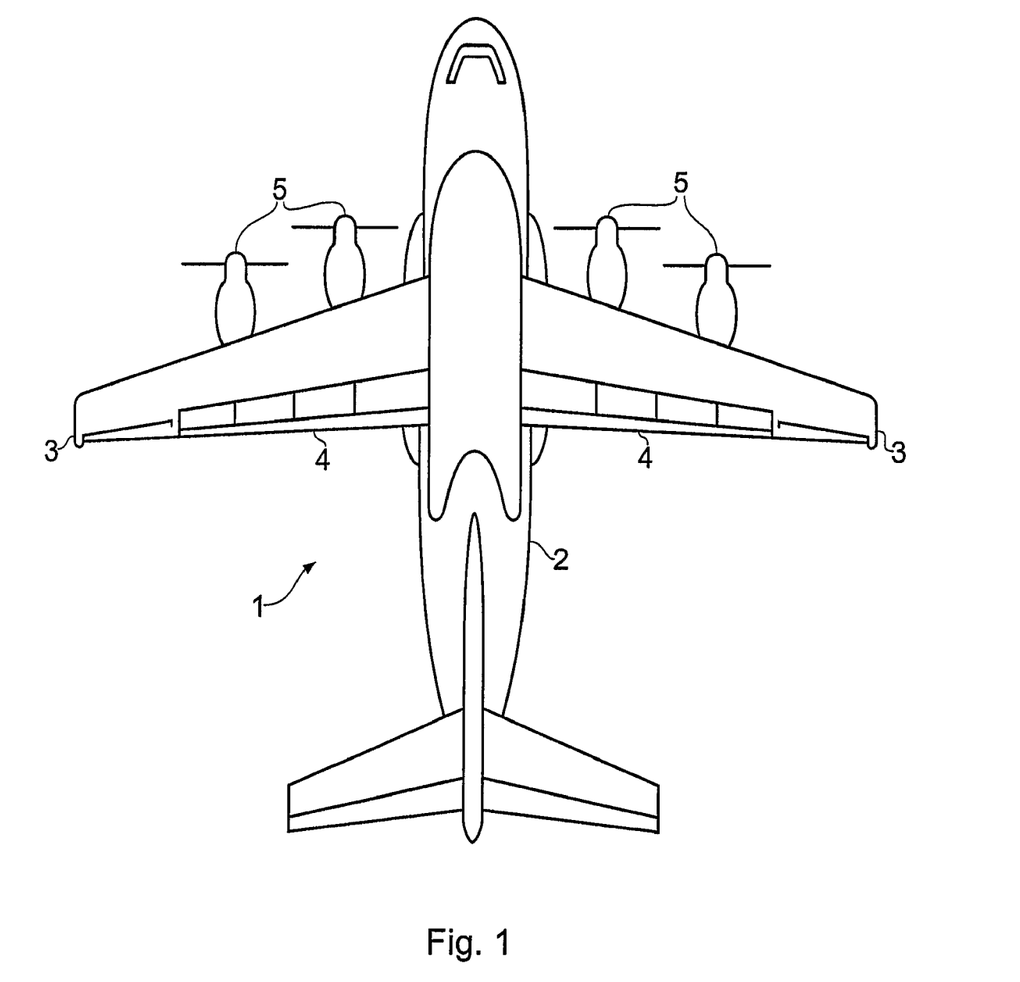
FIG. 1 is a plan view of an aircraft.

FIG. 1 shows an aircraft 1 with a fuselage 2 and a pair of wings each having a wing tip 3. Each wing has a pair of spars (not shown) attached to the fuselage and extending spanwise. Twenty four ribs (not shown) extend chordwise. Flaps 4 are mounted at the trailing edge of each wing. The flaps are carried by four flap attachments (not shown) each of which is secured to a respective rib. Each wing carries a pair of engines 5, and each engine is connected via a support structure (not shown) to a respective rib.

Figure 2:
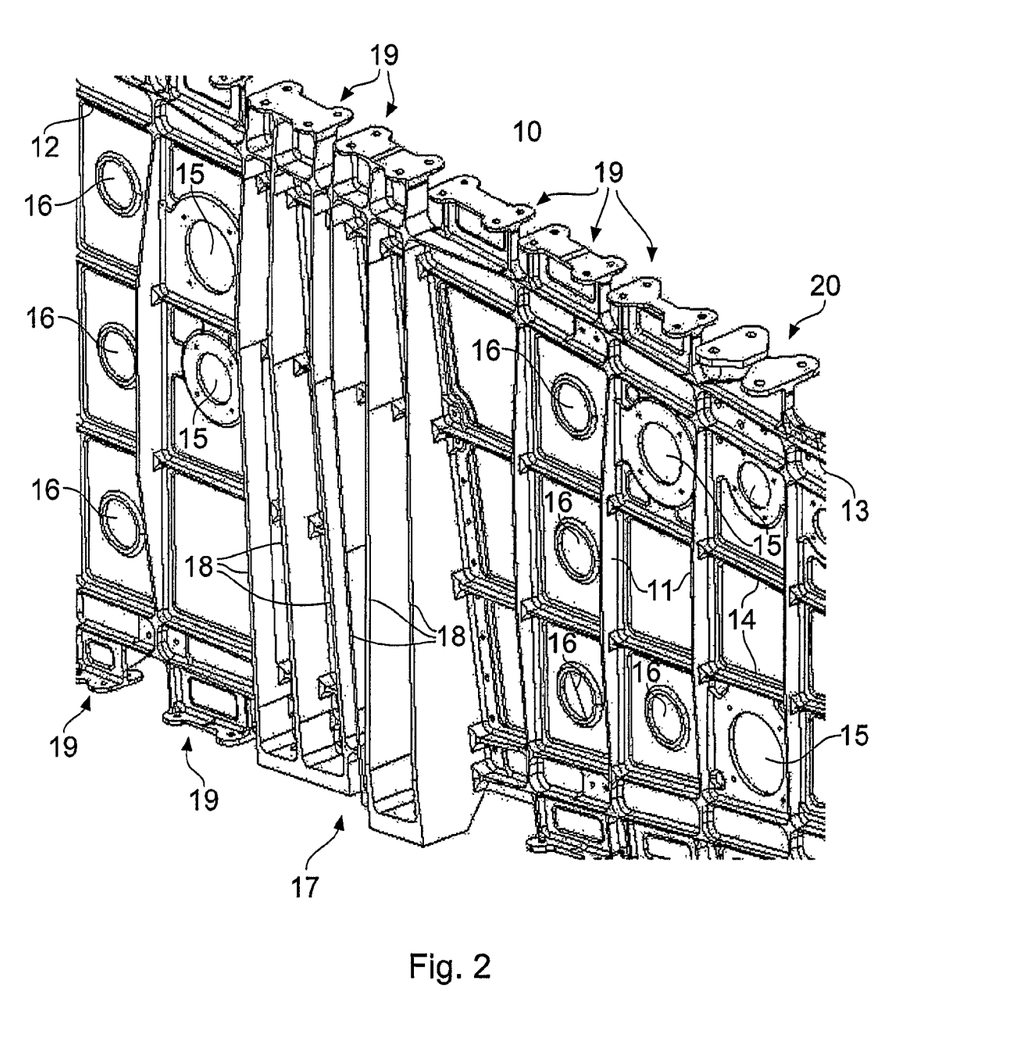
FIG. 2 is a view of part of a machined face of a wing rib.

FIG. 2 shows a machined face of one of the ribs 10 with the fore and aft edges of the rib omitted. The rib 10 is machined from an Aluminium billet to form a number of vertical stiffeners 11; a lower boom ridge 12 and an upper boom ridge 13; and horizontal stiffeners 14. Fuel system holes 15 are formed to accommodate fuel system pipes. Holes 16 are formed in the intra-rib webs in order to reduce the weight of the rib. A flap track attachment 17 is formed with vertical stiffeners 18.

The upper and lower edges of the rib 10 each carry a series of integral rib feet 19, arranged in a line along the rib. The upper edge of the rib also carries a two-part rib foot 20 in accordance with one embodiment of the invention, arranged in line with the integral rib feet. The rib feet 19 and 20 transfer load between the body of the rib and the wing skin.

Figure 3:
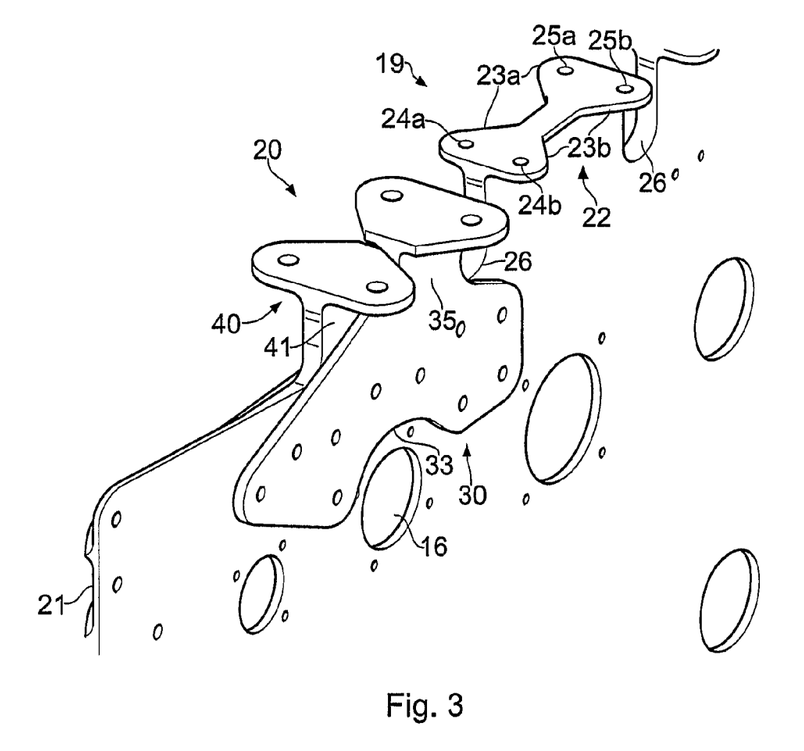
FIG. 3 is an enlarged view of part of the opposite face of the wing rib.

FIG. 3 shows the two-part rib foot 20 and an adjacent integral rib foot 19 in detail. FIG. 3 shows the opposite side of the rib to the side shown in FIG. 2. FIG. 3 also shows an aft edge 21 of the rib 10 which is attached to an aft spar (not shown).

The integral rib foot 19 is machined from the same piece of Aluminium as the rest of the rib, and comprises an arm 22 extending from the upper edge of the rib, a first flange 23a carried by the arm on a first side of the rib, and a second flange 23b carried by the arm on a second side of the rib. The flanges 23a, 23b are formed with a pair of bolt holes 24a, 24b at one end and a pair of bolt holes 25a,25b at the other end. The integral rib foot 19 is separated from adjacent rib feet by a pair of U-shaped channels 26. Thus the rib feet exhibit a castellated appearance when viewed from the left or right-hand sides of the rib.

Figure 4:
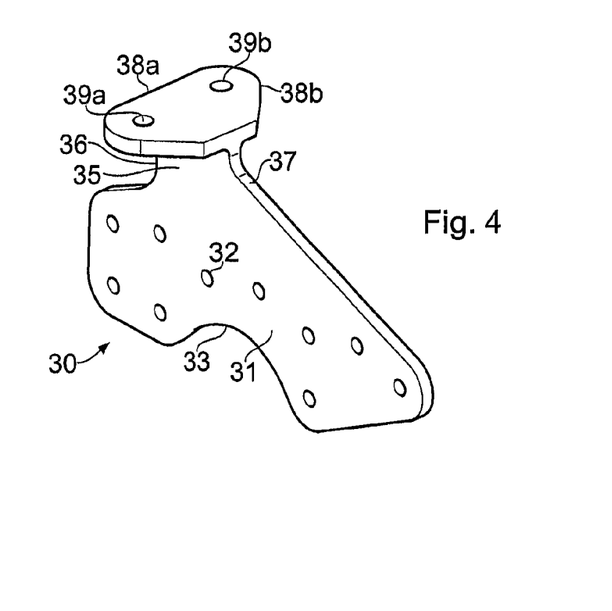
FIG. 4 shows a separate bolted on part.
Figure 5:
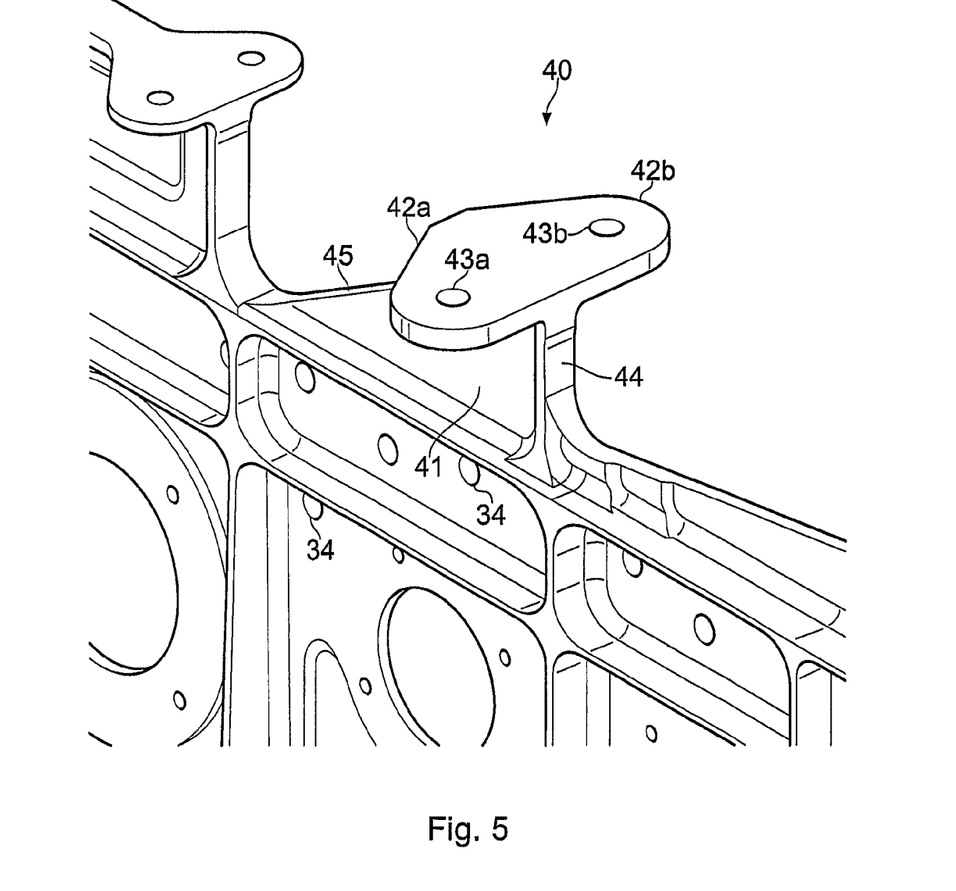
FIG. 5 is an enlarged view of part of the machined face of the wing rib with the bolted on part removed.

The two-part rib foot 20 comprises a separate bolted on part 30 shown in detail in FIG. 4, and an integrally formed part 40 shown in detail in FIG. 5.

Referring to FIG. 4, the bolted on part 30 comprises a vertical plate 31 with ten bolt holes 32. The plate 31 is formed with a recess 33 to provide clearance for a hole 16 as shown in FIG. 3. The plate 31 is fastened to the rib 10 by bolts (not shown) passing through bolt holes 34 in the rib (the bolt holes 34 being shown in FIG. 5).

An arm 35 extends from the upper edge of the plate 31. When viewed side-on, the arm 35 has a relatively wide base adjacent to the plate 31, a relatively narrow distal end, a vertical edge 36 and a triangular strengthening portion with an angled edge 37. The distal end of the arm 35 carries a first flange 38a on a first side of the plate and a second flange 38b on the opposite side of the plate. The flanges 38a, 38b have bolt holes 39a, 39b respectively.

The integrally formed part 40 shown in FIG. 5 is machined from the same piece of Aluminium as the rest of the rib, and comprises a projecting arm 41 extending from the upper edge of the rib. The arm 40 carries a first flange 42a on a first side of the rib and a second flange 42b on the opposite side of the rib. The flanges 42a, 42b have bolt holes 43a, 43b respectively. The arm 41 has a vertical edge 44 and a strengthening portion with an angled edge 45.

Figure 6:
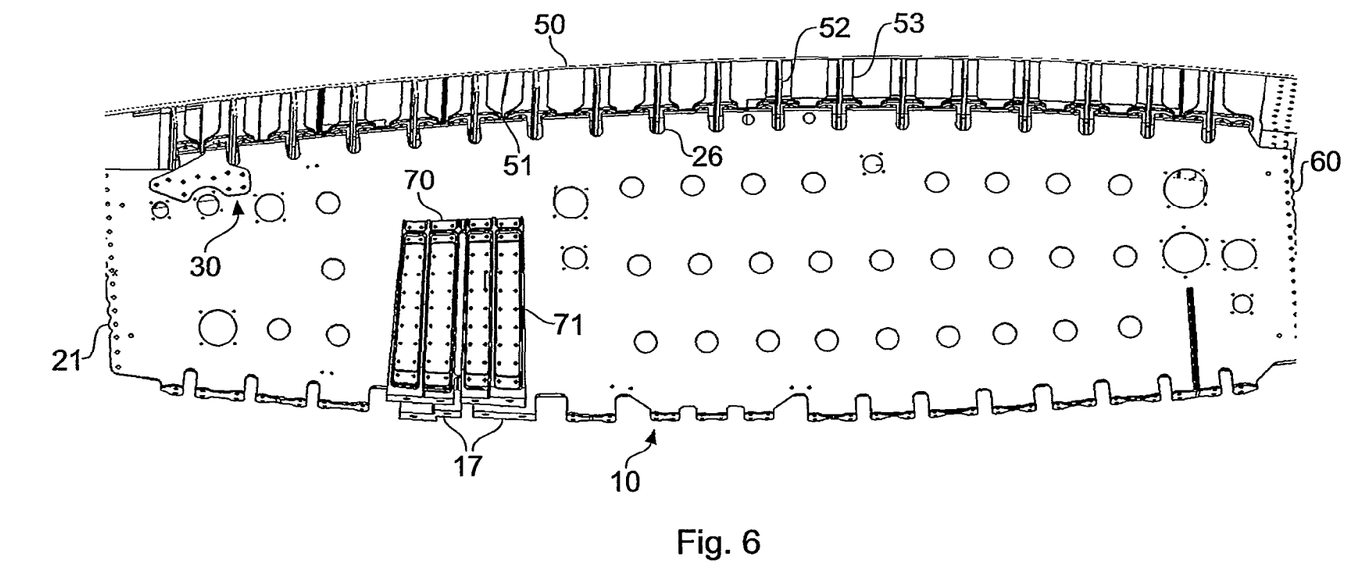
FIG. 6 is a view of the complete wing rib and a wing skin.
Figure 7:
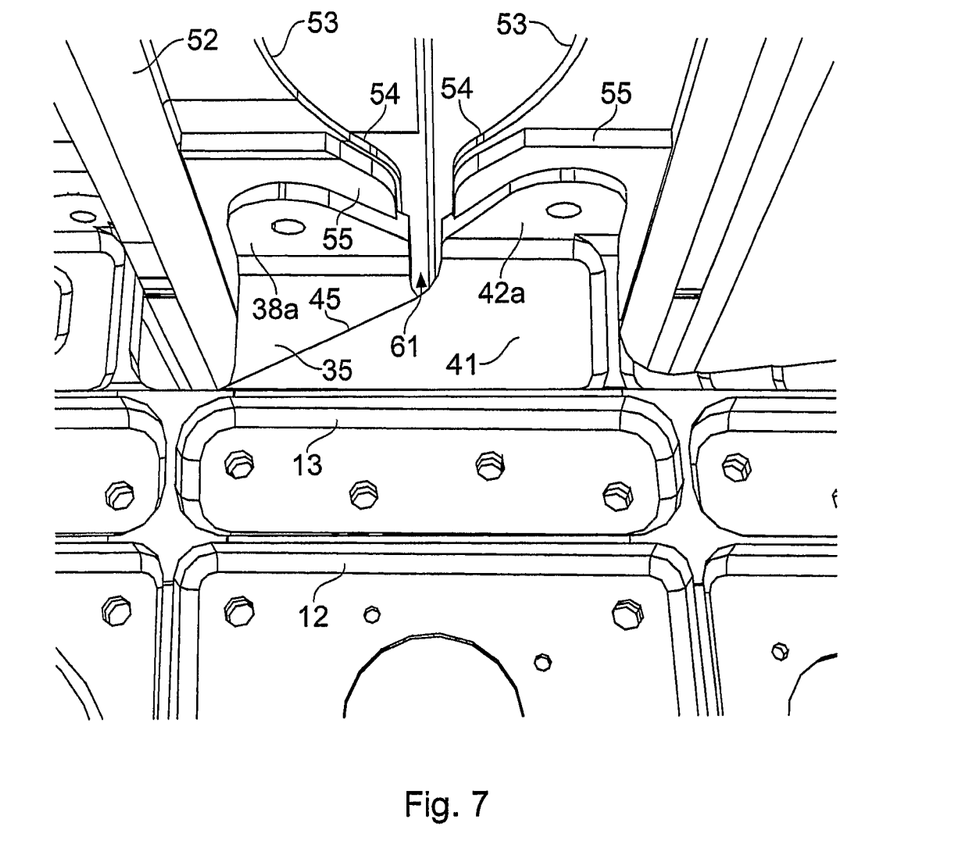
FIG. 7 is an enlarged view of the wing rib and wing skin, showing the two-part rib foot in detail.

FIG. 6 is a view of the rib 10 attached to a wing skin 50. The wing skin 50 has an external surface (not visible in FIG. 6) forming an aerodynamic outer surface of the wing, and an internal surface 51 carrying a series of stringers running spanwise along the wing. The stringers are T-shaped in cross section with the upright 52 of the T extending into the interior of the wing and lying in a U-shaped channel 26 between two rib feet, and the arms 53 of the T lying parallel with the inner surface 51 of the skin 50. FIG. 7 shows in detail the two-part rib foot and two adjacent stringers. As shown in FIG. 7, the stringer arms 53 have parallel sides between the ribs, but as they approach a rib they taper outwardly to form wide portions 54. Bolts (not shown) pass through the rib feet, plates 55, the wide portions 54 of the stringer arms 53, and the skin 50. In the illustrated embodiment, the wing skin 50 is formed from a composite material such as carbon-fibre reinforced plastic. Similarly, the stringers are formed from a composite material such as carbon-fibre reinforced plastic.

Referring to FIG. 6, the fore and aft edges 21, 60 respectively of the rib are attached to fore and aft spars (not shown). A flap track attachment 70 is bolted onto the rib by means of bolts (not shown) passing through bolt holes 71. A pair of lugs (not shown) are bolted on one side to the flap track attachment 17, and on the other side to the bolted on flap track attachment 70. The weight of the flaps is transferred to the flap track attachments 17, 70 by the lugs. As can be appreciated in the view of FIG. 6, there are only four rib feet between the flap track attachments 17,70 and the spar attached to the fore edge 21 of the rib. These rib feet carry high loads and in particular the last rib foot before the spar. In the event of failure of one of the rib feet, load is transferred to the adjacent rib feet. In the region between the flap track attachments and the spar which is attached to the fore edge 21 of the rib, these transferred loads can be excessive if an entire rib foot (that is, one carrying four bolts) fails. This problem is particularly acute in a composite wing because a composite wing skin typically has a lower bearing strength compared with a conventional Aluminium wing skin and thus the loads are concentrated in isolated portions of the wing skin which can result in structural problems. To solve this problem, as will be discussed in detail below, in the event of failure the two-part rib foot 20 is designed to only result in the loss of two bolts, not four.

To this end, in the event of a horizontal crack propagating through the arm 22 of the integral rib foot 19, the entire rib foot 19 will fail. However, propagation of the crack to adjacent rib feet will be prevented by the U-shaped channels 26 (see FIG. 3). By contrast, in the case of the two-part rib foot 20, a horizontal crack across the arm 35 of the separate bolted on part 30 will not propagate through to the arm 41 of the adjacent part 40, and vice versa. This is because there is no connection between the arms 35,41 above the upper boom 13 (although the arms do engage with each other in this area). As a result, failure of the part 30 will not lead to failure of the part 40, and vice versa. This results in acceptable loads on the remaining two bolts of the intact portion of the rib foot as well as the bolts on the adjacent connectors.

Forming the part 30 as a separate connector (instead of forming it integrally with the adjacent connector 40) enables it to be attached to the body of the rib close to the connector 40, whilst reducing or eliminating the chance of a crack propagating between them.

The two-part rib foot 20 is designed to fail in a symmetrical manner. That is, if either the part 30 or 40 fails, then the remaining part has two bolts arranged symmetrically with respect to the fore-aft axis of the rib. This can be contrasted with an alternative non-symmetrical construction in which the two bolts on one side of the rib are carried by a bolted on part, and the two bolts on the other side of the rib are carried by an integrally formed part. In this alternative non-symmetrical construction, failure of one part would result in the remaining bolts being on one side of the rib only. This eccentricity would result in a moment about the rib, and consequent spanwise loading in the composite wing skin which can exceed the bearing strength of the wing skin. In contrast, in the case of the two-part rib foot 20, the failure of one part would result in the remaining load-bearing bolts being on both sides of the line of rib feet and thus a symmetrically applied, albeit increased, load, but little or no moment about the rib.

A further problem associated with composite wing skins is that the Aluminium rib feet to which they are attached have a different coefficient of thermal expansion relative to the composite wing skin. This results in differential expansion which places additional load on the joint. The symmetrical nature of the two-part rib foot 20 means that such loads are not only distributed equally on both sides of the line of rib feet in the event of failure, it also reduces the chordwise magnitude of the differential thermal expansion because the flanges 38, 42 are separated by a gap 61 (shown most clearly in FIG. 7) and have a smaller dimension than the integral flanges 23a, 23b as measured in the chordwise direction.

FIG. 7 shows the triangular strengthening portion of the arm 41 (with angled edge 45), and shows how the strengthening portion overlaps the adjacent arm 35 when viewed from the machined side of the rib. The strengthening portion increases the bending stiffness of the arm 41, and the overlap provides a compact arrangement. Similarly the stiffening portion of the arm 35 overlaps the other arm 41 as shown most clearly in FIG. 3. The triangular shape of the strengthening portion gives high bending stiffness with relatively low weight.

Although the invention has been described above with reference to one or more preferred embodiments, it will be appreciated that various changes or modifications may be made without departing from the scope of the invention as defined in the appended claims.

The invention claimed is:

1. A method of manufacturing an aircraft component, the method comprising:
providing a planar body with two or more connectors arranged in a line on the body, each connector having an arm extending from the body, a first flange positioned on a first side of the planar body, and a second flange positioned on a second side of the planar body; and
attaching a separate connector to the body, the separate connector having an arm extending from the body, a first flange positioned on said first side of the body, and a second flange positioned on said second side of the body, wherein the arm of the separate connector overlaps the arm of an adjacent one of the connectors when viewed from one of said sides of the body.

2. A method of manufacturing an aircraft structure, the method comprising:
manufacturing an aircraft component by the method of claim 1; and
fastening the component to a cover by passing fastening elements through the flanges of the connectors and through the cover, the cover having an aerodynamic external surface.

3. An aircraft component comprising a planar body; and a series of connectors arranged in a line on the body, each connector having an arm extending from the body, a first flange positioned on a first side of the planar body and a second flange positioned on a second side of the planar body, wherein at least one of the connectors is a separate connector whose arm at least partially overlaps and is attached to the body.

4. The component of claim 3 wherein the arm of the separate connector and/or the arm of the adjacent one of the connectors has a strengthening portion which overlaps the other arm when viewed from a side of the body.

5. The component of claim 4 wherein the strengthening portion has an angled edge.

6. The component of claim 3 wherein the arm of the separate connector has a relatively wide base adjacent to the body and a relatively narrow distal end which carries the flanges.

7. The component of claim 3 wherein the aircraft component comprises a wing rib, and the connectors comprise rib feet.

8. The component of claim 3 wherein each flange has one or more fastening holes for receiving a fastening element.

9. The component of claim 3 wherein the separate connector is secured to the body by two or more fasteners, each fastener passing through the separate connector and the body.

10. The component of claim 3 wherein at least one of the connectors is formed integrally with the body.

11. The component of claim 3 further comprising a strengthener extending along the body adjacent to the connectors.

12. The component of claim 11 wherein the separate connector is secured to the body on a far side of the strengthener.

13. An aircraft structure comprising a component according to claim 3; and a cover secured to the connectors, the cover having an aerodynamic external surface.

14. The structure of claim 13 wherein the cover has an internal surface carrying a plurality of strengtheners, each strengthener being received in a channel between a pair of the connectors.

15. The structure of claim 13 wherein the connectors and the cover are formed from different materials.

* * * * *